(12) United States Patent
Yang et al.

(10) Patent No.: US 11,675,565 B2
(45) Date of Patent: Jun. 13, 2023

(54) AUDIO SWITCHING DEVICE

(71) Applicant: ACCO Brands Corporation, Lake Zurich, IL (US)

(72) Inventors: Ya-Hui Yang, Taipei (TW); Hsin Chih Lu, Taipei (TW)

(73) Assignee: ACCO Brands Corporation, Lake Zurich, IL (US)

(*) Notice: Subject to any disclaimer, the term of this patent is extended or adjusted under 35 U.S.C. 154(b) by 11 days.

(21) Appl. No.: 17/467,866

(22) Filed: Sep. 7, 2021

(65) Prior Publication Data

US 2023/0071184 A1    Mar. 9, 2023

(51) Int. Cl.
| | |
|---|---|
| H04R 29/00 | (2006.01) |
| G06F 3/16 | (2006.01) |
| H04R 3/00 | (2006.01) |
| H04W 76/30 | (2018.01) |
| H04W 4/80 | (2018.01) |

(52) U.S. Cl.
CPC ............... *G06F 3/165* (2013.01); *H04R 3/00* (2013.01); *H04W 4/80* (2018.02); *H04W 76/30* (2018.02); *H04R 2420/01* (2013.01); *H04R 2420/07* (2013.01)

(58) Field of Classification Search
CPC .......... H04W 76/30; H04W 4/80; H04R 3/00; H04R 2420/01; H04R 2420/07; G06F 3/165
USPC .................................................... 381/59, 58
See application file for complete search history.

(56) References Cited

U.S. PATENT DOCUMENTS

| | | |
|---|---|---|
| 6,157,726 A | 12/2000 | Carroll et al. |
| 7,016,266 B2 | 3/2006 | Wang |
| 7,187,948 B2 | 3/2007 | Alden |
| 7,369,532 B2 | 5/2008 | Silvester |
| 7,395,090 B2 | 7/2008 | Alden |

(Continued)

FOREIGN PATENT DOCUMENTS

| | | |
|---|---|---|
| CN | 206611557 U | 11/2017 |
| EP | 1760896 B1 | 9/2010 |

(Continued)

OTHER PUBLICATIONS ebay, "4-Way 3.5mm AUX Switch Box Passive Manual Audio Selector Headphone Jack Splitter" <https://www.ebay.co.uk/itm/4-Way-3-5mm-AUX-Switcher-4-1-Audio-Selector-Input-Control-Box-Manual-Switching/264310312527> webpage accessed Oct. 28, 2020.

(Continued)

*Primary Examiner* — Ammar T Hamid
(74) *Attorney, Agent, or Firm* — Michael Best & Friedrich LLP (57) ABSTRACT

An audio switching device includes a housing, a first user interface, and a controller within the housing and in electronic communication with the first user interface. The controller is configured to connect a first audio source to the audio switching device, connect a first listening device to the audio switching device, such that an output from the first audio source is received at the first listening device, receive a first input from the first user interface, disconnect the first listening device in response to receiving the first input, and (Continued)

connect a second audio listening device to the audio switching device, such that an output from the first audio source is received at the second listening device.

21 Claims, 6 Drawing Sheets

(56) References Cited

U.S. PATENT DOCUMENTS

| | | | |
|---|---|---|---|
| 8,014,824 | B2 | 9/2011 | Alden |
| 8,073,137 | B2 | 12/2011 | Weinans et al. |
| 8,086,287 | B2 | 12/2011 | Mooney et al. |
| 8,841,799 | B2 | 9/2014 | Yamkovoy et al. |
| 10,255,219 | B2 | 4/2019 | Jensen |
| 10,514,884 | B2 | 12/2019 | Mathur |
| 2002/0068610 | A1 | 6/2002 | Anvekar et al. |
| 2005/0130697 | A1 | 6/2005 | Dyer |
| 2007/0004472 | A1 | 1/2007 | Gitzinger |
| 2007/0019819 | A1 | 1/2007 | Garcia |
| 2010/0067723 | A1 | 3/2010 | Bergmann et al. |
| 2013/0094660 | A1 | 4/2013 | Weinstein et al. |
| 2016/0048310 | A1* | 2/2016 | Patil ............... G06F 3/0488 715/716 |
| 2018/0132039 | A1 | 5/2018 | Min |
| 2019/0215597 | A1* | 7/2019 | Ha ............... H04W 76/10 |
| 2019/0327555 | A1 | 10/2019 | Chen et al. |
| 2019/0342687 | A1 | 11/2019 | Lai et al. |
| 2020/0022198 | A1* | 1/2020 | James ............... H04W 4/80 |

FOREIGN PATENT DOCUMENTS

| | | |
|---|---|---|
| EP | 2262117 B1 | 2/2013 |
| JP | 3029811 B2 | 4/2000 |
| JP | 2004039085 A | 2/2004 |
| KR | 20010090994 A | 10/2001 |
| KR | 1020170070689 A | 6/2017 |

OTHER PUBLICATIONS

ElectronicsUSA, "MK-1 A-B Audio Switch Box: 2 Input 1 Output Selects Two Inputs to One Output" <http://electronicsusa.com/mk1and2.html> webpage accessed Oct. 28, 2020.

Newegg, "Nobsound Litle Bear MC1023 2-Way Audio Microphone Headset Speaker MIC Switcher Headphone Switch Hub Volume Control Controller Selector 3.5mm RCA Advanced Version (MIC Headset & Speaker)" <https://www.newegg.com/p/2S7-04NY-001B8> webpage accessed Oct. 28, 2020.

Radio Design Labs, "RDL Introduces EZ Series 4 ×1 Stereo Audio Switchers" <https://web.archive.org/web/20091123030423/https://www.rdlnet.com/press/RDL_PR2009-15_EZ_SWITCHERS.pdf> webpage accessed Oct. 28, 2020.

International Search Report and Written Opinion for Related Application No. PCT/US2022/041172 dated Dec. 6, 2022 (10 pages).

* cited by examiner

AUDIO SWITCHING DEVICE

BACKGROUND

The present disclosure relates to an audio switching device for connecting an audio source such as a cellphone, a music player, a laptop computer, or a tablet computer to a listening device such as wired or wireless headphones.

SUMMARY

An audio switching device includes a housing, a first user interface, and a controller within the housing and in electronic communication with the first user interface. The controller is configured to connect a first audio source to the audio switching device, connect a first listening device to the audio switching device, such that an output from the first audio source is received at the first listening device, receive a first input from the first user interface, disconnect the first listening device in response to receiving the first input, and connect a second audio listening device to the audio switching device, such that an output from the first audio source is received at the second listening device.

An audio switching device has a housing, a first user interface, and a controller within the housing and in electronic communication with the first user interface. A method of operating the audio switching device includes connecting a first audio source to the audio switching device, connecting a first listening device to the audio switching device, such that an output from the first audio source is received at the first listening device, receiving a first input from the first user interface, disconnecting the first listening device in response to receiving the first input, and connecting a second audio listening device to the audio switching device, such that an output from the first audio source is received at the second listening device.

An audio switching device includes a housing, a first user interface, a first wireless transceiver, a second wireless transceiver, and a controller within the housing and in electronic communication with the first user interface. The controller is configured to connect a first audio source to the audio switching device via the first wireless transceiver, connect a first listening device to the audio switching device, such that an output from the first audio source is received at the first listening device via the second wireless transceiver, receive a first input from the first user interface, disconnect the first listening device in response to receiving the first input, and connect a second audio listening device to the audio switching device, such that an output from the first audio source is received at the second listening device.

Other features and aspects of the disclosure will become apparent by consideration of the following detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways. Also, it is to be understood that the phraseology and terminology used herein is for the purpose of description and should not be regarded as limiting.

Figure 1:
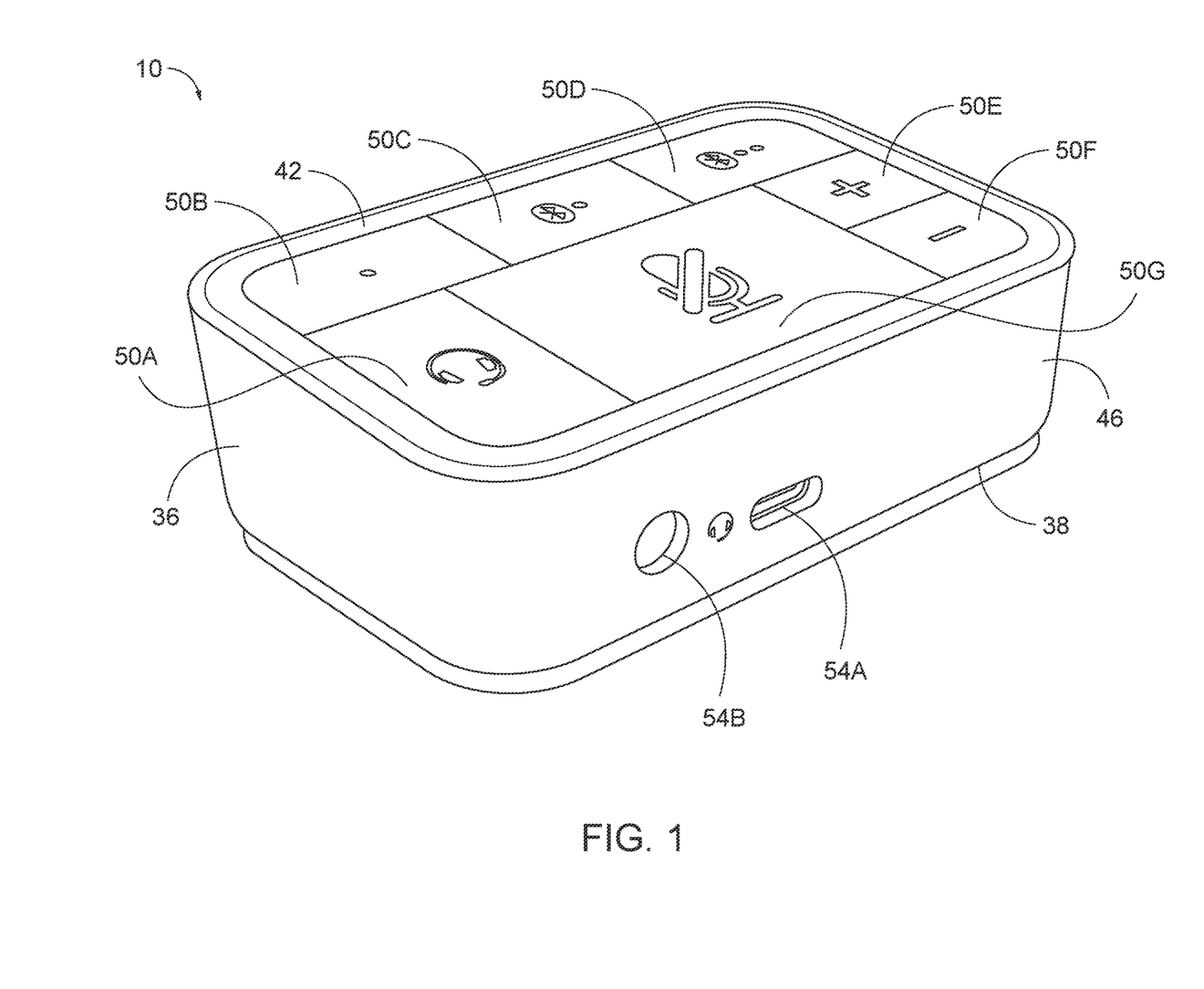
FIG. 1 is a perspective view of an audio switching device.
Figure 2:
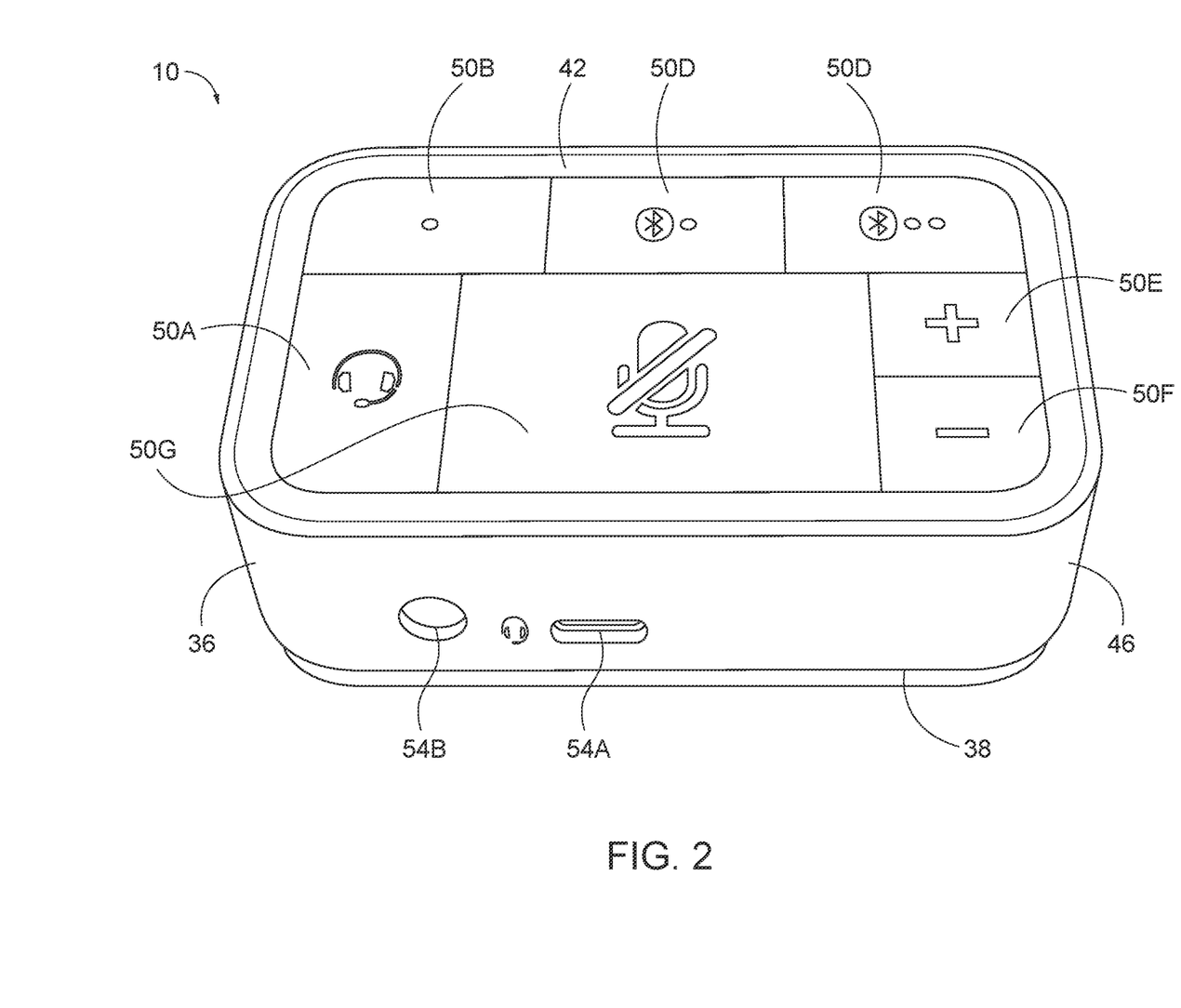
FIG. 2 is a perspective view of the audio switching device of FIG. 1, illustrating a top surface of the audio switching device.
Figure 3:
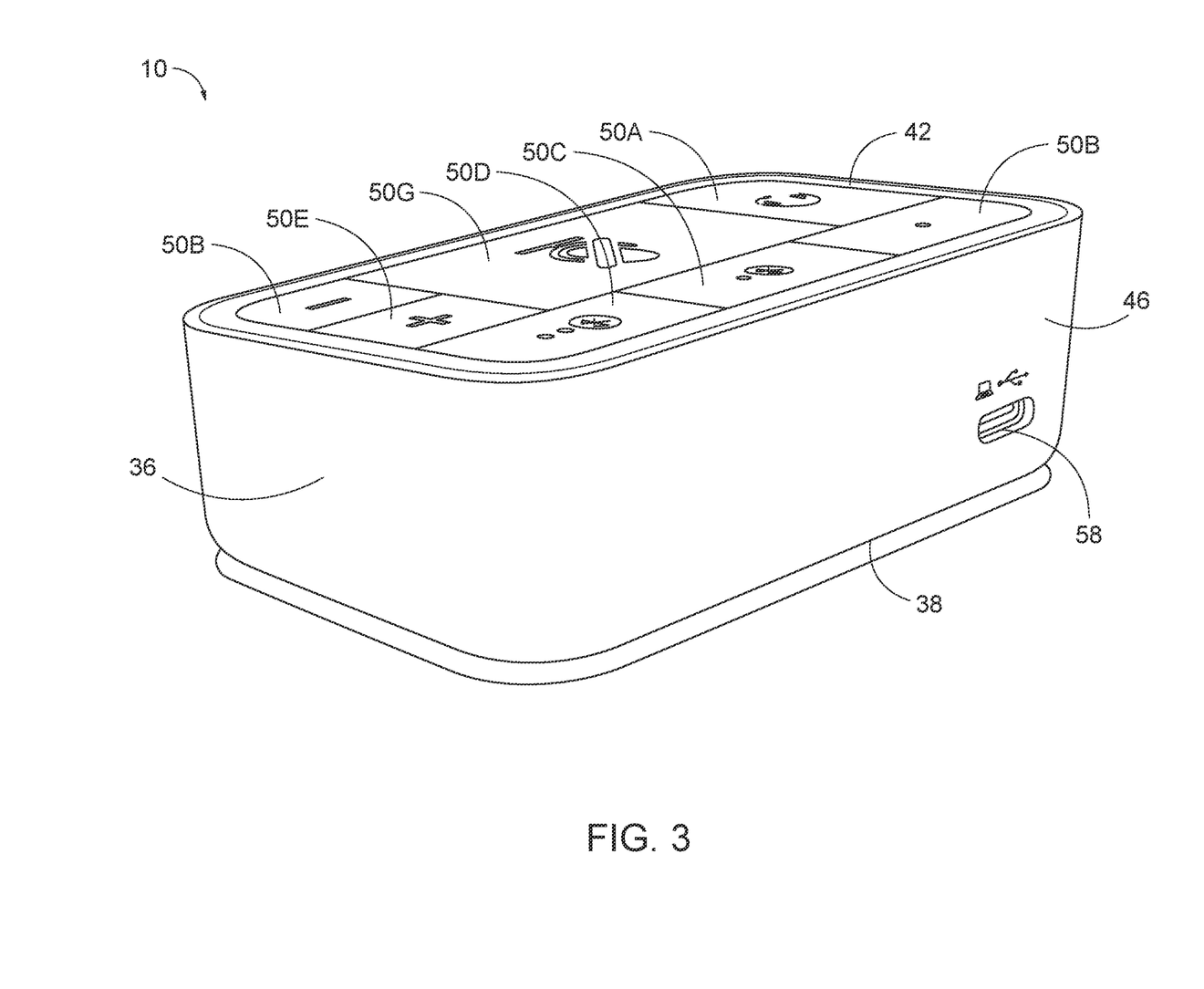
FIG. 3 a perspective view of the audio switching device of FIG. 1, illustrating a rear surface of the audio switching device.
Figure 4:
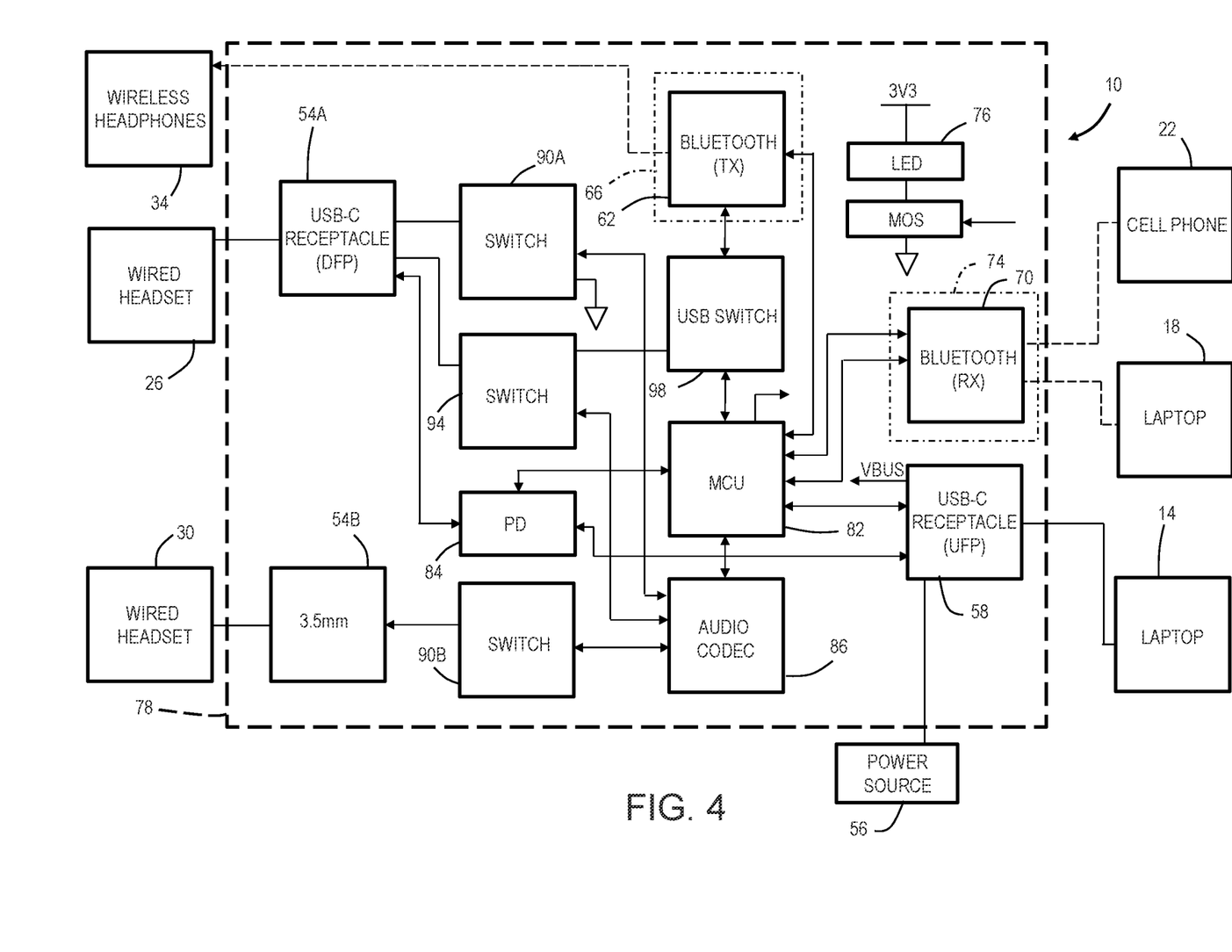
FIG. 4 is a schematic view of a control system of the audio switching device of FIG. 1.

FIGS. 1-3 illustrate an audio switching device 10 that functions as an intermediary between audio sources 14, 18, 22 (FIG. 4) and listening devices 26, 30, 34 (FIG. 4). Each of the audio sources 14, 18, 22 are devices configured to generate an electrical audio signal and may include one or more of laptop or desktop computers, tablet computers, cellular phones such as smartphones, televisions, gaming systems, and instruments. Each of the listening devices 26, 30, 34 are devices configured to receive the audio signal and relay the audio signal as an audible sound to a user. The listening devices 26, 30, 34, may include one or more of wired headphones or headsets, wireless headphones or headsets, and loudspeakers, The audio switching device 10 is separate and distinct from the audio sources 14, 18, 22 and the listening devices 26, 30, 34. The switching device interacts with the audio sources 14, 18, 22 and listening device 26, 30, 34 by receiving an input from the audio sources 14, 18, 22 and generating an output for the listening device 26, 30, 34.

The audio switching device 10 includes a housing 36 defining an internal volume therein for supporting various electrical components of the audio switching device 10. The housing 36 includes a base 38 that rests upon a surface such as a tabletop or desktop surface. A top surface 42 is opposite the base 38 with sidewalls 46 extending between the top surface 42 and the base 38. The top surface 42 includes a plurality of user interface elements 50A, 50B, 50C, 50D, 50E, 50F, 50G that, as shown, are actuators or buttons, though may be otherwise implemented as switches, dials, or touch screen panels (e.g., resistive or capacitive inputs).

As shown in FIG. 1, one of the sidewalls 46, a front sidewall, includes a plurality of audio output ports 54A, 54B, each audio output port 54A, 54B configured to couple to one or more of the listening devices 26, 30, 34. The audio output ports 54A, 54B, as shown, include a USB-C port 54A and a 3.5 mm port 54B, though additional and/or alternative audio output ports may be utilized. The audio output ports 54A, 54B are located within the housing 36 and are accessible through openings in the sidewall 46 such that a user is able to insert a terminal of different listening devices 26, 30 into the ports 54A, 54B. Some listening devices are wireless listening devices, such as wireless headphones 34 and are incapable of coupling to one of the audio output ports 54A, 54B as they lack an audio connector insertable into the ports 54A, 54B. Some listening devices are separately capable of wired connection and wireless connection. Wireless listening device 34 couples to the audio switching device 10 via a wireless transceiver 62 (FIG. 4) located within the housing. As shown, the wireless transceiver 62 is a Bluetooth chipset.

With reference to FIG. 3, one of the sidewalls 46, as shown a rear sidewall, includes an audio input port 58 (e.g., a USB-C port) configured to receive an electrical signal from an audio source 14 coupled to the port 58. While shown with only a single audio input port 58, additional audio input ports of similar (e.g., USB-C) or dissimilar (e.g., USB 3.0, Lightning Port, etc.) design may be used to provide additional or alternative options for coupling a wired audio source 14 to the audio switching device 10. Similar to the audio output ports 54A, 54B, the audio input port 58 is located within the housing 36 and is accessible through an opening in the sidewall 46. The audio input port 58 also functions as a power port for coupling to a power source 56. In some embodiments, the power source 56 is an electrical output or a USB (e.g. USB-C) port on an electric device such as a computer. The power source 56 provides electrical power to the audio switching device 10 via the port 58. In other embodiments, the audio switching device 10 includes a separate power port for coupling to the power source 56. In other, battery-powered embodiments, the audio switching device 10 may omit the power port 60, instead including a battery bay for housing one or more batteries for powering the audio switching device 10. In still further embodiments, the power source 56 may provide power to charge one or more rechargeable batteries configured to power the audio switching device 10.

A wireless receiver 70 is located within the housing 36 and is programmed to receive electrical signals from audio sources 18, 22 that couple wirelessly with the audio switching device 10. As shown, the wireless receiver 70 is a Bluetooth chipset 74 that is separate and distinct from the Bluetooth chipset 66 associated with the wireless transceiver 62.

The user interface elements 50A-G, when actuated, initiate operations to modify the input or the output of the audio switching device 10 among other functions, such as volume control, pairing commands, etc. The embodiment shown in FIG. 2 illustrates the user interface elements 50 as actuators that are engaged, pressed, depressed and/or clicked, though alternative user interface elements may include dials that are turned, switches that are flipped and displaced and/or capacitive or resistive inputs that are pressed or otherwise manipulated.

A first user interface 50A is an output switching button. When engaged by the user (e.g., when pressed), the first user interface 50A modifies which one of the plurality of listening devices 26, 30, 34 receives an audio signal from the paired one of the audio sources 14, 18, 22. A paired audio source 14, 18, 22 is an audio source 14, 18, 22 that is connected to the audio switching device 10 and selected for transmitting audio to a connected listening device 26, 30, 34. Multiple audio sources 14, 18, 22 may be connected to the audio switching device 10, but only one audio source 14, 18, 22 is paired at any given time. Similarly, a paired listening device is the one listening device 26, 30, 34 (of all of the connected listening devices 26, 30, 34) that is selected for receiving audio.

In one scenario, the first listening device 26 is connected to the first audio output port 54A, the second listening device 30 is connected to the second audio output port 54B, and the third listening device 34 is connected via a Bluetooth connection to the wireless transceiver 62. Pressing the first user interface 50A switches between a paired "wired" listening device and a paired "wireless" listening device. With the first listening device 26 receiving an audio signal from the connected audio source 14, 18, 22, pressing the first user interface 50A disconnects the first listening device 26 at the first port 54A and connects the third listening device 34 via the wireless transceiver 62. As shown, the audio switching device is only configured to pair one wired listening device 26, 30 at a time and prioritizes the most recently connected device. As such, pressing the first user interface 50A again disconnects the third listening device 34 and reconnects the first listening device 26.

In an alternative embodiment, pressing the first user interface 50A a second time disconnects the third listening device 34 and connects the second listening device 30 at the second port 54B. In such an embodiment, pressing the first user interface 50A one more time cycles back to the original connection of the first listening device 26.

In some embodiments, the connection order of listening device 26, 30, 34 as a user presses the first user interface 50A may be based on pairing order. In other embodiments, the order is a factory setting or a user defined order. In some embodiments, the audio switching device 10 follows the same order regardless of whether a listening device 26, 30, 34 is paired to the respective port 54A, 54B and transceiver 62. In other embodiments, pressing the first user interface 50A only cycles between the output ports 54A, 54B and transceiver 62 that are currently coupled to a listening device 26, 30, 34.

A second user interface, including a second set of actuators 50B, 50C, 50D is a series of input switching actuators. Each of the second buttons 50B, 50C, 50D is associated with a different audio source 14, 18, 22 respectively. By pressing the user interface 50B associated with the first audio source 14, the user couples the paired listening device 26, 30, 34 to the first audio source 14. By pressing the user interface 50C associated with the second audio source 18, the user couples the paired listening device 26, 30, 34 to the second audio source 18. Finally, by pressing the user interface 50D associated with the third audio source 22, the user couples the paired listening device 26, 30, 34 to the third audio source 22. While the second user interface is illustrated having three distinct buttons, in other embodiments, the second user interface can include a single button that can toggle between the connected audio sources 14, 18, 22, similar to how the first user interface 50A toggles between the listening devices 26, 30, 34.

The third and fourth user interfaces 50E, 50F may be for modulating a volume of the audio signal provided from the paired audio source 14, 18, 22 to the paired listening device 26, 30, 34. The third user interface 50E, when pressed, increases the volume of the audio signal and the fourth user interface 50F, when pressed, decreases the volume of the audio signal. The user interface 50G may be configured to mute the audio signal provided from the microphone associated with the paired listening device 26, 30, 34 such that when the fifth user interface 50G is pressed (to an "ON" state) no sound is transmitted from the microphone associated with the paired listening device 26, 30, 34. When the fifth user interface 50G is pressed (to an "OFF" state), the audio signal 50G is transmitted from the microphone associated with the listening device 26, 30, 34.

In some embodiments, one or more of the user interface elements 50A-G (or a portion of the user interface element 50A-G, such as an icon on a button) may be backlit by an LED 76 (FIG. 4) or other illumination device to identify a status to the user. For example, the first user interface 50A may be illuminated a first color when the first listening device 26 is paired via the first audio output port 54A, a second color when the second listening device 30 is paired via the second audio output port 54B, and a third color when the third listening device 34 is paired via the wireless transceiver 62. The LED 76 may also flash or generate a pattern or color change when pairing or unpairing a listening device 36, 30, 34. The LEDs 76 may additionally be associated with the second user interface, illuminating the user interfaces 50B, 50C, 50D associated with the paired audio source 14, 18, 22. In some embodiments, the user interfaces 50E, 50F may illuminate when pressed by a user and the mute button 50G may illuminate when activated to the "ON" state (or may change colors when activated to the "ON" state).

FIG. 4 is a block diagram illustrating a control system 78 of the audio switching device 10. The control system 78 includes various components configured to carry out the various functions and operations described herein. In one embodiment, the controller 82 may be or include an electronic processor. The controller may be implemented as a programmed microprocessor, an application specific integrated circuitry (ASIC), one or more field programmable gate arrays (FPGA), a group of processing components, or with other suitable electronic processing components. The controller 82 may further include a memory (for example, a non-transitory, computer readable medium) which may include one or more devices (for example, RAM, ROM, Flash memory, hard disk storage, etc.). The memory may include database components, object code components, script components, or any other type of information structure for supporting the various activities and information structure described in the present application. In one embodiment, the memory includes computer code or other instructions for executing one or more processes described herein.

The controller 82 may be configured to facilitate communication between the connected listening devices 26, 30, 34 and the connected audio sources 14, 18, 22. For example, the controller 82 is in electronic communication with the wired connections to the ports 54A, 54B, 58 and the wireless transceiver 62 and receiver 70, which in turn may provide communication to the connected listening devices 26, 30, 34 and the connected audio sources 14, 18, 22. Although labeled and described as a wireless receiver 70, the wireless receiver may otherwise be considered a second wireless transceiver as it can communicate during pairing with the external devices. As described in more detail below, the controller 82 is programmed to connect one or more of the paired listening devices 26, 30, 34 to the one or more paired audio sources 14, 18, 22 by receiving input signals from the user interfaces 50 and providing output signals to facilitate the desired output as dictated by the input (i.e., modifying the paired audio input device, modifying the paired listening device, modifying the volume).

The wireless transceiver 62 and wireless receiver 70 are likewise components of the control system 78. The wireless transceiver 62 and the wireless receiver 70 may utilize one or more wireless communication protocols to provide communication to/from the connected wireless listening device 34 and the connected wireless audio sources 18, 22. In one embodiment, the wireless transceiver 62 and the wireless receiver 70 utilize Bluetooth or Bluetooth Low Energy (BLE) communication protocols to provide communication between the connected wireless listening device 34 and/or the connected wireless audio sources 18, 22 and the audio switching device 10. However, other wireless communication protocols, such as LoRA, Zigbee, Wi-Fi, etc. are also contemplated. In one specific example, the wireless receiver 70 is a first Bluetooth chipset 74 and the wireless transceiver 62 is a second Bluetooth chipset 66 separate from the first Bluetooth chipset 74. While the first Bluetooth chipset 74 and the second Bluetooth chipset 66 are shown as separate devices, it is contemplated that the separate chipsets 74, 66 may be combined in a single monolithic package. The controller 82 is electrically coupled to both the wireless transceiver 62 and the wireless receiver 70 and is configured to manage and control the operation of both the wireless transceiver 62 and the wireless receiver 70, as described below.

The control system 78 additionally includes one or more audio codecs to encode analog audio as digital signals and decode digital signals into analog audio. In one embodiment, the controller 82 is configured to control the operation of the audio codec 86. In one specific embodiments, the audio codec 86 is configured to receive digital information from the controller 82 that was received from one or more input devices (e.g. audio sources 14, 18, 22) such as via the wireless receiver 74 and/or the USB-C receptacle 58. The audio codec 86 then decodes audio data from the received digital information for output via one or more audio output ports 54A, 54B. The audio output ports 54A, 54B are coupled to the audio codec 86 via respective audio switches 90A, 90B which are configured to output audio to the desired wired output device, such as wired headsets 26, 30. The audio switches 90A, 90B may be configured to detect the presence of an analog microphone and output audio accordingly. The control system 78 additionally includes a switch 94 (e.g., a double-pole, double throw multiplexer) between the USB-C audio output port 54A that allows for audio output port 54A to operation either as an audio output and/or provide data transfer between the audio output port 54A and the audio switching device 10. A USB switch 98 may be coupled between the audio output port 54A and the wireless transceiver 66 to allow for data output by the controller 82 to be provided to one or more of the output receptacle 54A and the wireless transceiver 66.

For example, the audio switching device 10 may receive power from a power source 56 via the power receptacle 58. The power delivery controller 84 may be configured to distribute power received from the power source to one or more components within the audio switching device 10, such as the controller 82, the audio code 86, the wireless receiver 70, the wireless transmitter 66, etc. The power delivery controller 84 may further be configured to distribute power received via the power source 56, to one or more devices coupled to the audio output port 54*a* and/or the audio input port 58. In other embodiments, the power delivery controller 84 is provided to control power transfer and output to devise coupled via the output 54A, where the output 54A is a USB-C output port configured to allow bi-directional power flow. In some embodiments, the controller 82 may further be configured to control one or more power management processes by controlling the power delivery controller 84.

In operation, with the audio switching device 10 connected to a power source 56, a user connects one or more listening devices 26, 30, 34 to the audio switching device 10 via the audio output ports 54A, 54B and/or the wireless transceiver 62. Similarly, the user connects one or more audio sources 14, 18, 22 to the audio switching device 10 via the audio input port 58 (the audio source 22 may already be connected to the audio input port 58 if the audio source 22 is additionally the power source 56) and/or the wireless receiver 70. With the audio sources 14, 18, 22 and listening devices 26, 30, 34 coupled to the audio switching device 10, the controller 82 pairs one of the listening devices 26, 30, 34 to one of the audio sources 14, 18, 22. As such, a user is able to listen to the audio of the paired one of the audio sources 14, 18, 22 through the paired one of the listening devices 26, 30 34.

Figure 5:
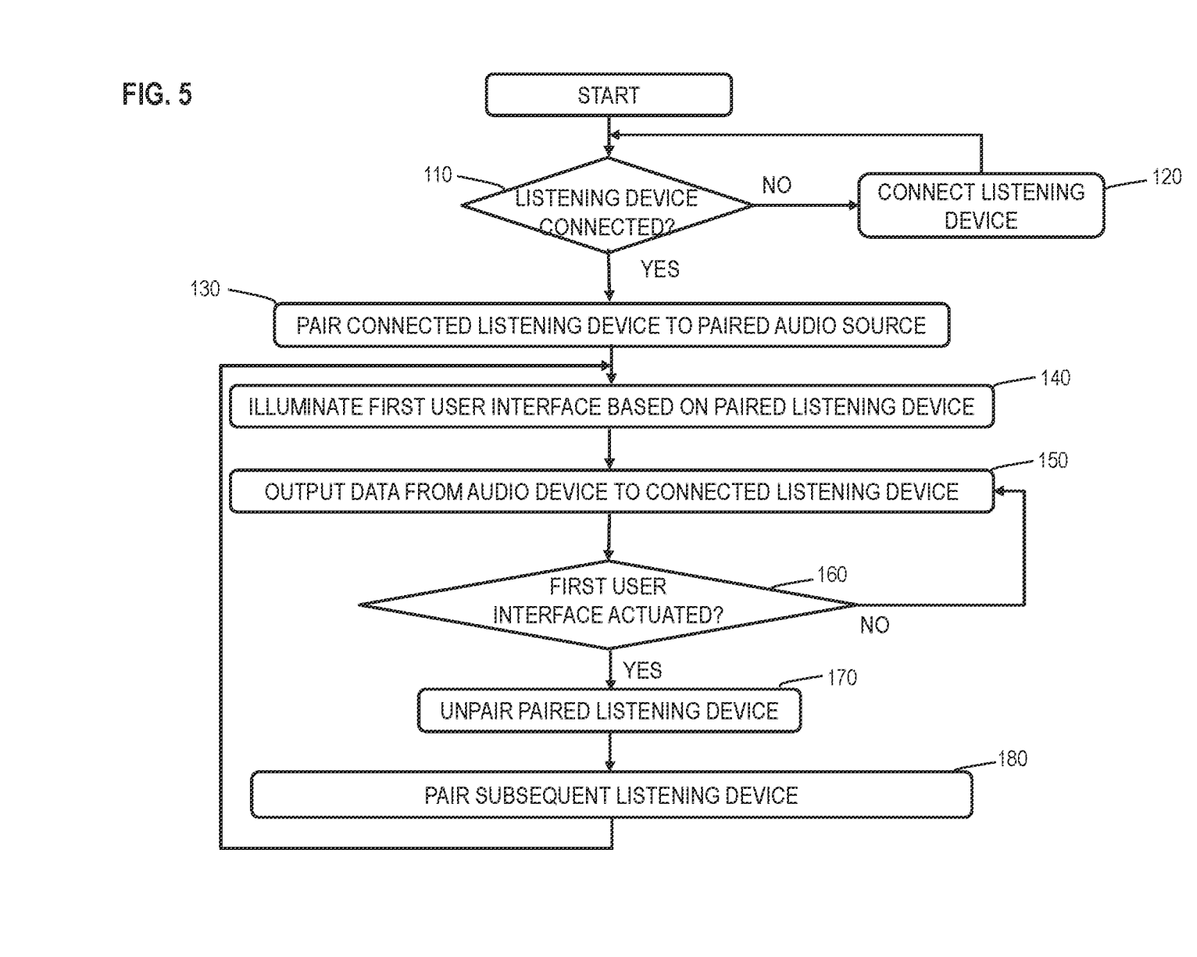
FIG. 5 is a flow chart illustrating a method of use switching listening devices connected to the audio switching device of FIG. 1.

FIG. 5 is a flow chart illustrating a process for connecting one or more listening devices, such as listening devices 26, 30, 34 to the audio switching device 10. At process block 110, the controller 82 determines whether a listening device 26, 30, 34 is connected to the audio switching device 10 either via a wired connection or via a wireless connection. In response to determining that a first listening device of the listening devices 26, 30, 34 is not connected, the controller 82 attempts to connect to a listening device 26, 30, 34 (e.g., via Bluetooth pairing), as shown at process block 120. A user may hold down the first user interface 50A (or a different interface/combination of interfaces) for a prescribed amount of time to enter a pairing mode to locate a wireless listening device 34. An LED 76 may illuminate in different manners (solid, blinking, different colors) to identify an active pairing mode, a failed pairing, and/or a successful pairing. In some examples, the controller 82 may attempt to pair to the most recently paired listening device, 26, 30, 34, the most recently connected listening device 26, 30, 34, or may attempt to connect to a listening device 26, 30, 34 based on a predetermined or user-defined hierarchy/pairing order in response to determining that a first listening device of the listening devices 26, 30, 34 is not connected.

In response to determining that a first listening device of the listening devices 26, 30, 34 is connected to the audio switching device 10, as shown at process block 130, the controller 82 connects the first listening device 26, 30, 34 to a connected audio source 14, 18, 22 such that audio or other data from the connected audio source is transferred to the first listening device via the audio switching device 10 at process block 150. At process block 140, an indication is provided on the audio switching device 10 indicating which listening device 26, 30, 34 is connected to the audio switching device 10. In some embodiments, an LED 76 associated with the first user interface 50A provides illumination of the first user interface indicating which listening device 26, 30, 34 is paired. This may involve, for example, illuminating the first user interface 50A using a color, wherein specific colors provide an indication as to which listening device 26, 30, 34 is connected to the audio switching device 10. For example, where the first listening device is determined to be connected, a blue color may be provided on the first user interface 50A. However, other colors are contemplated. Process blocks 140 and 150 may occur substantially simultaneously or one may occur shortly before the other.

At process block 160, the controller 82 determines whether the first user interface 50A has been actuated. In response to determining that the first user interface has not been actuated, the controller 82 continues operation at process block 150. In response to determining that the first user interface 50A has been actuated, the controller 82 unpairs the first listening device at process block 170 and pairs the audio switching device 10 to a second listening device of the listening devices 26, 30, 34 to the audio switching device 10 at process block 180.

For example, a user may be listening to an audio signal from a first audio source of the audio sources 14, 18, 22 such as a smartphone via a first listening device of the listening devices 26, 30, 34, such as wireless headphones (coupled via the Bluetooth connection 62. The first audio source is paired with the first listening device through the audio switching device 10. The first audio source is wirelessly connected to the audio switching device 10 via the wireless receiver 70 and the third listening device is wirelessly connected to the audio switching device 10 via the wireless transceiver 62. The user decides to switch which listening device is paired to the first audio source and wants to switch to a second listening device of the listening devices 26, 30, 34, such as a wired headset. The user actuates the first user interface 50A, which unpairs the first listening device from the first audio source and instead pairs the second listening device to the first audio source 14. If the pairing order prioritizes a third listening device 30 over the second listening device, the user would actuate the first user interface 50A to pair the second listening device. The user then receives audio from the first audio source through the second listening device.

Figure 6:
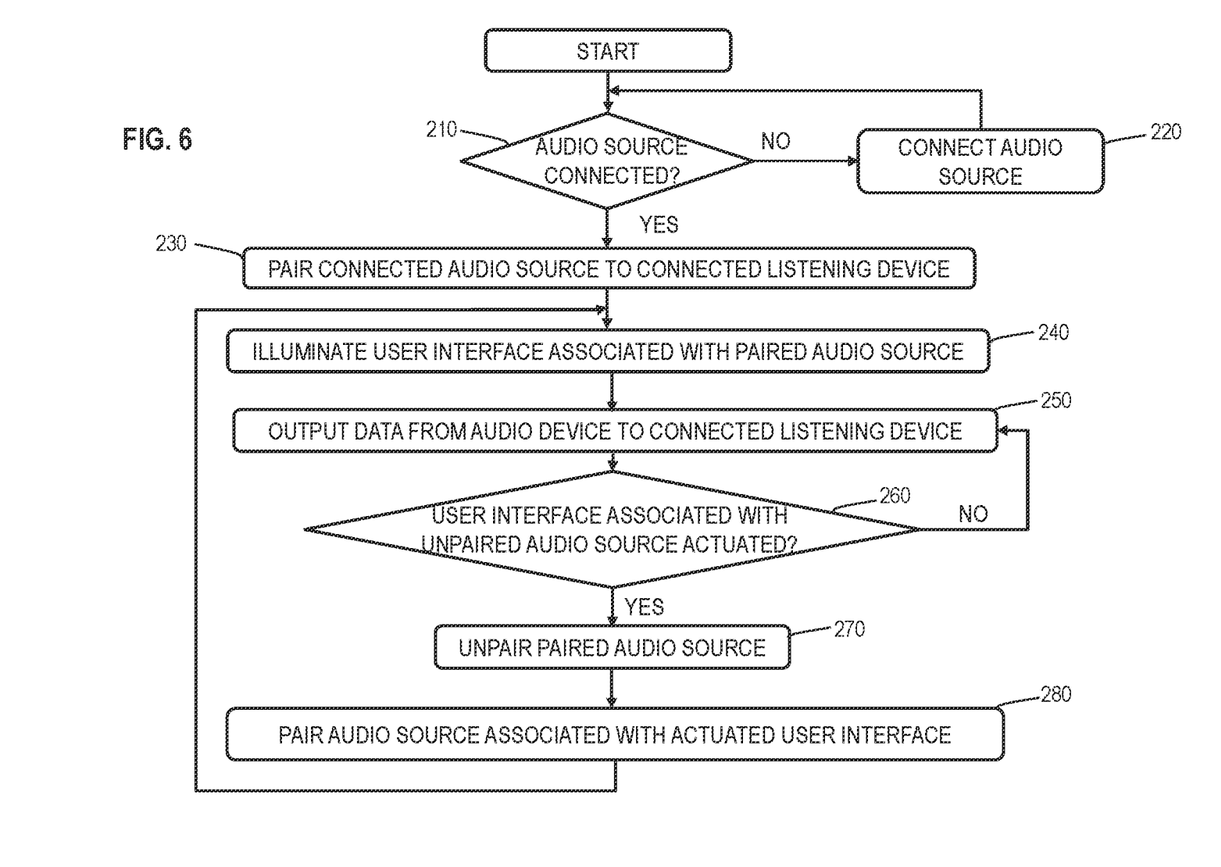
FIG. 6 is a flow chart illustrating a second method of switching audio inputs connected to the audio switching device of FIG. 1.

FIG. 6 is a flow chart illustrating a process for connecting one or more audio sources 14, 18, 22 to the audio switching device 10. At process block 210, the controller 82 determines whether an audio source 14, 18, 22 is connected to the audio switching device 10 either via a wired connection or a wireless connection. In response to determining that a first audio source of the audio sources 26, 30, 34 is not connected, the controller 82 attempts to connect to an audio source 14, 18, 22 (e.g., via Bluetooth pairing) as shown at process block 220. A user may hold down the associated user interface 50C, 50D (or a different interface/combination of interfaces) for a prescribed amount of time to enter a pairing mode to locate a wireless audio source 18, 22. An LED 76 may illuminate in different manners (solid, blinking, different colors) to identify an active pairing mode, a failed pairing, and/or a successful pairing. In some examples, the controller 82 may attempt to pair to the most recently paired audio source 14, 18, 22, the most recently connected audio sources 14, 18, 22, or may attempt to connect to an audio source 14, 18, 22 based on a predetermined or user defined hierarchy/pairing order in response to determining that a first audio source of the audio sources 14, 18, 22 is not connected. In other embodiments, the audio switching device 10 may not connect to any audio source 14, 18, 22 until a respective user interface 14, 18, 22 is actuated.

In response to determining that a first audio source of the audio sources 14, 18, 22 is connected to the audio switching device 10, the controller 82 connects the first audio source 14, 18, 22 to a connected listening device 26, 30, 34, as shown at process block 230, such that audio or other data from the connected audio source is transferred to the connected listening device via the audio switching device 10 at process block 250. At process block 240, an indication is provided on the audio switching device 10 indicating which audio source 14, 18, 22 is connected to the audio switching device 10. In some embodiments, an LED 76 associated with the user interface 50B, 50C, 50D corresponding to the paired audio source 14, 18, 22 provides illumination of the chosen user interface 50B, 50C, 50D to indicate which audio source 14, 18, 22 is paired. Process blocks 240 and 250 may occur substantially simultaneously or one may occur shortly before the other.

At process block 260, the controller 82 determines whether one of the second, third, or fourth user interfaces 50B, 50C 50D has been actuated. In response to determining that one of these user interfaces 50B, 50C, 50D has not been actuated, the controller 82 continues operation at process block 250. In response to determining that one of these user interface 50B, 50C, 50D has been actuated and is not associated with the currently paired audio source 14, 18, 22, the controller 82 disconnects the first audio source at process block 270 and connects the audio switching device 10 to a second audio source of the audio sources 16, 20, 24 to the audio switching device 10 at process block 280. If the first audio source 14 (associated with the second user interface 50B) is currently paired, the user presses either the third or fourth user interface 50C, 50D to pair the second or third audio source 18, 22, respectively.

In one example, a user is listening to an audio signal from a first audio source of the audio sources 14, 18, 22, such as a cell phone, via a first listening device of the listening devices 26, 30, 34, such as wireless headphones. The first audio source is paired with the first listening device through the audio switching device 10. The first audio source is wirelessly connected to the audio switching device 10 via the wireless receiver 70 and the first listening device are wirelessly connected to the audio switching device 10 via the wireless transceiver 62. The user decides to switch which audio source is paired to the first listening device and wants to switch to a second audio source of the audio sources 14, 18, 22, such as a laptop. The user actuates the one of the user interfaces 50B, 50C, 50D, such as the fourth user interface 50D, which unpairs the first audio source from the first listening device and instead pairs the second audio source to the first listening device. The user then receives audio from the second audio source through the first listening device.

Various features of the disclosure are set forth in the following claims.

What is claimed is:

1. An audio switching device comprising:
    a housing;
    a first user interface; and
    a controller within the housing and in electronic communication with the first user interface, wherein the controller is configured to:
        connect a first audio source to the audio switching device;
        connect a first listening device to the audio switching device, such that an output from the first audio source is received at the first listening device;
        receive a first input from the first user interface;
        disconnect the first listening device in response to receiving the first input; and
        connect a second audio listening device to the audio switching device, such that an output from the first audio source is received at the second listening device.

2. The audio switching device of claim 1, wherein the controller is further configured to:
    receive a second input from the first user interface;
    disconnect the second listening device in response to receiving the second input;
    connect a third audio listening device to the audio switching device, such that an output from the first audio source is received at the third listening device.

3. The audio switching device of claim 1, further comprising:
    a second user interface in communication with the controller;
    wherein the controller is further configured to:
        receive a first input from the second user interface;
        disconnect the first audio source from the audio switching device in response to receiving the first input from the second user interface; and
        connect a second audio source to the audio switching device.

4. The audio switching device of claim 3, wherein the controller is further configured to:
    receive a second input from the second user interface;
    disconnect the second audio source from the audio switching device in response to receiving the second input from the second user interface; and
    connect a third audio source to the audio switching device.

5. The audio switching device of claim 1, wherein the housing includes a base configured to rest upon an external surface, a top surface supporting the first user interface, and a plurality of sidewalls connecting the base to the top surface.

6. The audio switching device of claim 1, further comprising a first wireless transceiver positioned within the housing, wherein the first listening device is connected to the audio switching device via the first wireless transceiver.

7. The audio switching device of claim 6, further comprising a second wireless transceiver positioned within the housing, wherein the first audio source is connected to the audio switching device via the second wireless transceiver.

8. The audio switching device of claim 7, wherein the second wireless transceiver is a Bluetooth receiver, and wherein the first wireless transceiver is a Bluetooth transceiver separate and distinct from the second wireless transceiver.

9. A method of operating an audio switching device, the audio switching device having a housing, a first user interface, and a controller within the housing and in electronic communication with the first user interface, the method comprising:
    connecting a first audio source to the audio switching device;
    connecting a first listening device to the audio switching device, such that an output from the first audio source is received at the first listening device;
    receiving a first input from the first user interface;
    disconnecting the first listening device in response to receiving the first input; and
    connecting a second audio listening device to the audio switching device, such that an output from the first audio source is received at the second listening device.

10. The method of claim 9, wherein the audio switching device further comprises an audio output port coupled to the housing and a wireless transceiver positioned within the housing, wherein connecting the first listening device to the audio switching device includes connecting the first listening device via a wired connection via the audio output port or a wireless connection via the wireless transceiver.

11. The method of claim 10, wherein the wireless transceiver is a first wireless transceiver, wherein the audio switching device further comprises an audio input port coupled to the housing and a second wireless transceiver separate and distinct from the first wireless transceiver, wherein connecting the first audio source to the audio switching device includes connecting the first audio source via a wired connection via the audio inlet port or a wireless connection via the second wireless transceiver.

12. The method of claim 9, further comprising:
    receiving a second input from the first user interface;
    disconnecting the second listening device in response to receiving the second input;
    connecting a third audio listening device to the audio switching device, such that an output from the first audio source is received at the third listening device.

13. The method of claim 9, further comprising:
receiving a first input from a second user interface;
disconnecting the first audio source from the audio switching device in response to receiving the first input from the second user interface; and
connecting a second audio source to the audio switching device.

14. The method of claim 13, further comprising:
receiving a second input from the second user interface;
disconnecting the second audio source from the audio switching device in response to receiving the second input from the second user interface; and
connecting a third audio source to the audio switching device.

15. An audio switching device comprising:
a housing;
a first user interface;
a first wireless transceiver;
a second wireless transceiver; and
a controller within the housing and in electronic communication with the first user interface, wherein the controller is configured to:
  connect a first audio source to the audio switching device via the first wireless transceiver;
  connect a first listening device to the audio switching device, such that an output from the first audio source is received at the first listening device via the second wireless transceiver;
  receive a first input from the first user interface;
  disconnect the first listening device in response to receiving the first input; and
  connect a second audio listening device to the audio switching device, such that an output from the first audio source is received at the second listening device.

16. The audio switching device of claim 15, wherein the first wireless transceiver is a first Bluetooth chipset, and wherein the second wireless transceiver is a second Bluetooth chipset separate and distinct from the first Bluetooth chipset.

17. The audio switching device of claim 15, wherein the controller is further configured to:
  receive a second input from the first user interface;
  disconnect the second listening device in response to receiving the second input;
  connect a third audio listening device to the audio switching device, such that an output from the first audio source is received at the third listening device.

18. The audio switching device of claim 15, further comprising:
a second user interface in communication with the controller;
wherein the controller is further configured to:
  receive a first input from the second user interface;
  disconnect the first audio source from the audio switching device in response to receiving the first input from the second user interface; and
  connect a second audio source to the audio switching device.

19. The audio switching device of claim 18, wherein the controller is further configured to:
  receive a second input from the second user interface;
  disconnect the second audio source from the audio switching device in response to receiving the second input from the second user interface; and
  connect a third audio source to the audio switching device.

20. The audio switching device of claim 15, wherein the housing includes a base configured to rest upon an external surface, a top surface supporting the first user interface, and a plurality of sidewalls connecting the base to the top surface.

21. The audio switching device of claim 1, wherein the audio switching device is separate and distinct from the first listening device, the second listening device, and the first audio source.

* * * * *